(12) United States Patent
Nguyen et al.

(10) Patent No.: US 12,536,764 B2
(45) Date of Patent: Jan. 27, 2026

(54) GROUP FRAMING IN A VIDEO SYSTEM

(71) Applicant: Hewlett-Packard Development Company, L.P., Spring, TX (US)

(72) Inventors: Nhu Quynh Pham Nguyen, Austin, TX (US); Kishore Venkat Rao Goka, Leander, TX (US); Joshua Raglin, Austin, TX (US); Dhaval Patel, Austin, TX (US); Sakshi Gupta, Round Rock, TX (US); Venkateswarlu Lakkamraju, Tuam (IE); Krishna Balusu, Round Rock, TX (US)

(73) Assignee: Hewlett-Packard Development Company, L.P.

( * ) Notice: Subject to any disclaimer, the term of this patent is extended or adjusted under 35 U.S.C. 154(b) by 454 days.

(21) Appl. No.: 17/971,530

(22) Filed: Oct. 21, 2022

(65) Prior Publication Data

US 2023/0401808 A1 Dec. 14, 2023

Related U.S. Application Data

(60) Provisional application No. 63/351,302, filed on Jun. 10, 2022.

(51) Int. Cl.
| | |
|---|---|
| *G06V 10/24* | (2022.01) |
| *G06T 7/13* | (2017.01) |
| *G06T 7/62* | (2017.01) |
| *G06T 7/70* | (2017.01) |
| *G06V 10/25* | (2022.01) |
| *G06V 40/16* | (2022.01) |

(52) U.S. Cl.
CPC .............. *G06V 10/245* (2022.01); *G06T 7/13* (2017.01); *G06T 7/62* (2017.01); *G06T 7/70* (2017.01); *G06V 10/25* (2022.01); *G06V 40/161* (2022.01); *G06T 2207/30201* (2013.01)

(58) Field of Classification Search
CPC .... G06V 10/245; G06V 10/25; G06V 40/161; G06V 20/52; G06T 7/13; G06T 7/62; G06T 7/70; G06T 2207/30201; G06T 2207/30196; G06T 2210/12; G06T 2210/22; G06T 2207/20132; G06T 2207/30242
See application file for complete search history.

(56) References Cited

U.S. PATENT DOCUMENTS

| | | | |
|---|---|---|---|
| 9,465,997 B2 * | 10/2016 | Tu | G06F 18/254 |
| 12,069,396 B2 * | 8/2024 | Tangeland | H04L 65/403 |
| 2008/0205869 A1 * | 8/2008 | Nose | G03B 17/20 |
| | | | 396/77 |

(Continued)

*Primary Examiner* — Matthew C Bella
*Assistant Examiner* — Nicholas John Helco
(74) *Attorney, Agent, or Firm* — Quarles & Brady LLP

(57) ABSTRACT

A method may include obtaining, using a head detection model and for an image in a video stream, head detection information on the video stream, identifying a group vertical size of a group on a vertical axis using the head detection information, and identifying a group horizontal size of the group on a horizontal axis using the head detection information. Method may in addition include determining an orientation of the group using the group horizontal size and group vertical size, creating a group frame definition using the orientation, and outputting the video stream using the group frame definition.

20 Claims, 12 Drawing Sheets

(56) References Cited

U.S. PATENT DOCUMENTS

| | | | |
|---|---|---|---|
| 2009/0015658 A1* | 1/2009 | Enstad | H04N 7/15 |
| | | | 348/240.99 |
| 2009/0201541 A1* | 8/2009 | Neogi | H04N 1/00204 |
| | | | 358/1.15 |
| 2011/0069085 A1* | 3/2011 | Weber | G06T 11/60 |
| | | | 345/620 |
| 2017/0026719 A1* | 1/2017 | Zhiwen | G11B 27/031 |
| 2018/0096449 A1* | 4/2018 | Racz | G06V 40/161 |
| 2018/0286199 A1* | 10/2018 | Chen | G06V 10/46 |
| 2019/0354777 A1* | 11/2019 | Beck | G06V 20/52 |
| 2020/0184674 A1* | 6/2020 | Hayashi | G06V 20/593 |
| 2021/0125582 A1* | 4/2021 | Kast | G09G 5/363 |
| 2021/0256835 A1* | 8/2021 | Ranasinghe | H04N 23/90 |
| 2021/0398333 A1* | 12/2021 | Kalu | H04N 5/2628 |

* cited by examiner

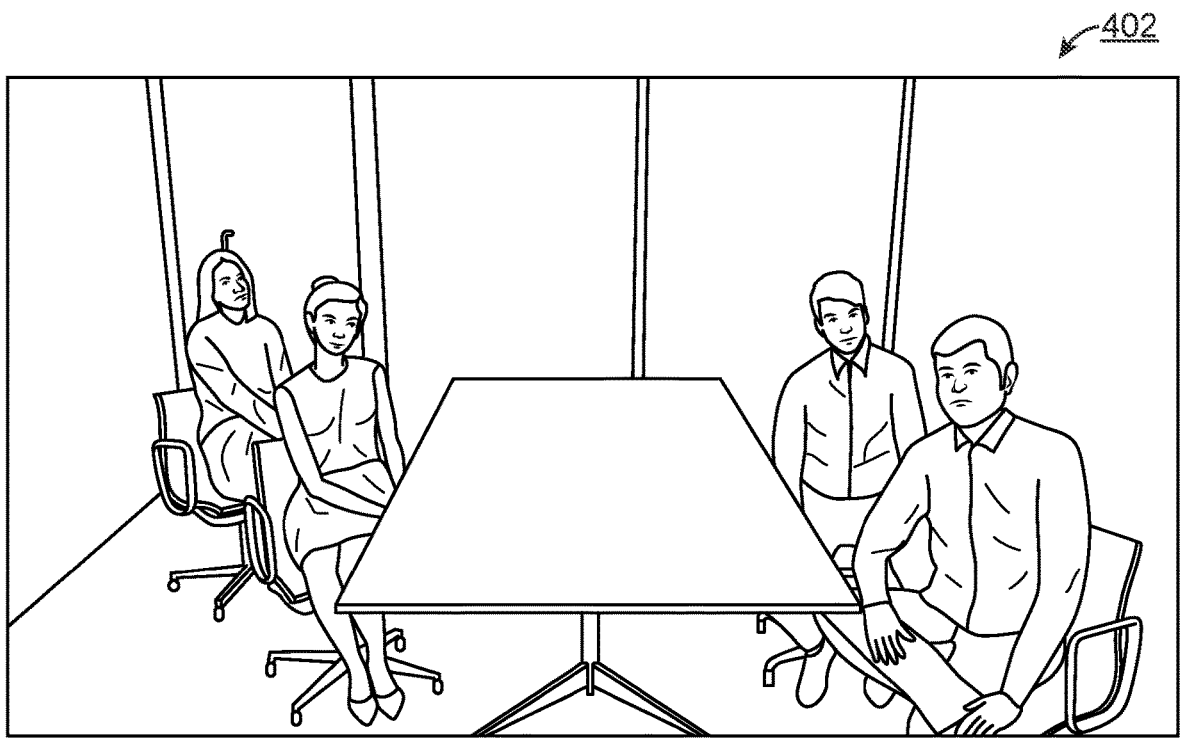
FIG. 4

GROUP FRAMING IN A VIDEO SYSTEM

CROSS REFERENCE TO RELATED APPLICATIONS

This application is a non-provisional application claiming benefit under 35 U.S.C. § 119(e) to U.S. Pat. App. Ser. No. 63/351,302 filed on Jun. 10, 2022, which is incorporated herein by reference in its entirety.

BACKGROUND

Video systems capture and process video streams. A video stream is a sequence of images captured by at least one camera. For example, a video system may be a conferencing system or a part of a conference system, or a video system may be used to capture a video stream for later playback. In some cases, the video system uses a video stream from one or more cameras, where the video stream is of multiple people in a same room. In such a scenario, the video system may perform framing operations to modify the video stream. Framing operations changes the view of a video stream, such as by cropping the images and zoom in on a portion of the images.

SUMMARY

In one general aspect, a method may include obtaining, using a head detection model and for an image in a video stream, head detection information on the video stream, identifying a group vertical size of a group on a vertical axis using the head detection information, and identifying a group horizontal size of the group on a horizontal axis using the head detection information. Method may in addition include determining an orientation of the group using the group horizontal size and group vertical size, creating a group frame definition using the orientation, and outputting the video stream using the group frame definition.

In one general aspect, system may include a video processor having: a head detection model configured to generate head detection information for an image of an input video stream, a frame generator configured to generate a group frame definition for a group. Generating the group frame definition may include identifying a group vertical size of the group on a vertical axis using the head detection information, identifying a group horizontal size of the group on a horizontal axis using the head detection information, determining an orientation of the group using the group horizontal size and group vertical size, and creating the group frame definition using the orientation. System may also include an image framing processor configured to output an output video stream from the input video stream using the group frame definition.

In one general aspect, method may include extracting an image of a video stream, the image showing a group. Method may also include obtaining head detection bounding boxes for the image of the video stream, adding a buffer around each of the head detection bounding boxes, and determining a vertical line for the group as a line from a top edge of a topmost buffer to a bottom edge of a bottom most buffer. The method may also include determining a horizontal line for group as a line from left edge of left most buffer to a right edge of a right most buffer, calculating a group vertical size as a length of the vertical line, calculating a group horizontal center as a center of the horizontal line and a group horizontal size as a length of the horizontal line. The method may also include calculating a ratio of group horizontal size to group vertical size, and identifying an orientation by comparing the ratio to a threshold. The method may also include positioning a group framing template using the group horizontal center based on the orientation indicating that the group is group horizontal center to obtain a positioned group framing template. The method may furthermore include adding a buffer around the positioned group framing template to generate a group frame definition. The method may in addition include outputting the video stream using group frame definition.

Other aspects of the invention will be apparent from the following description and the appended claims.

BRIEF DESCRIPTION OF DRAWINGS

FIGS. 4, 5, 6, 7, 8, 9, 10, and 11 show an example in accordance with one or more embodiments.

Like elements in the various figures are denoted by like reference numerals for consistency.

DETAILED DESCRIPTION

In general, embodiments of the disclosure are directed to performing group framing in a video system. The video system is any system in which a video stream is captured by a camera, such as a conference call, video recording, or a live single room conference or gathering which is captured by a camera. A frame is portion of an image of a video stream. A group frame is a portion of a whole frame focused on a group of people in a room.

Group framing is a framing technique that expands and focuses the view of the group in order to exclude the unused areas of the room in which the group is located. Specifically, many room cameras for conference rooms have field of view that covers substantially the whole room. Thus, when people are in meetings in a conference room, the conference rooms camera captures whole room view. However, people in the conference room may be comparatively close together to the whole room view. The sending of the whole room view creates a far end experience where the end user sees much of the room environment (i.e., unused areas of the room) and small heads of the people in the room.

To perform group framing, one or more embodiments use a machine learning model that identifies the heads of people in the room. Next, the group size is determined in the horizontal and vertical directions. The group size is the span of the group as captured by the camera on the horizontal and vertical axes. For example, on the horizontal axis, the group size is the distance from the left most person in the group to the right most person in the group as captured by the camera. On the vertical axis, the group size is the distance from the topmost person in the group to the bottom most person in the group as captured by the camera. Based on the group size, the orientation of the group as being more vertical or horizontal is determined and is used to generate a group frame definition. The group frame definition defines which portion of an image of a video stream is part of the group frame and which portion of the video stream is outside of the group frame. Based on the group frame definition, the input video stream is cropped to generate an output video stream composed of group frames. Thus, group framing transmits video stream having group frames having the people group and crops off the excess room environment. Because the focus is on the group of people an enhanced meeting room viewing experience is created for a group of people.

Figure 1:
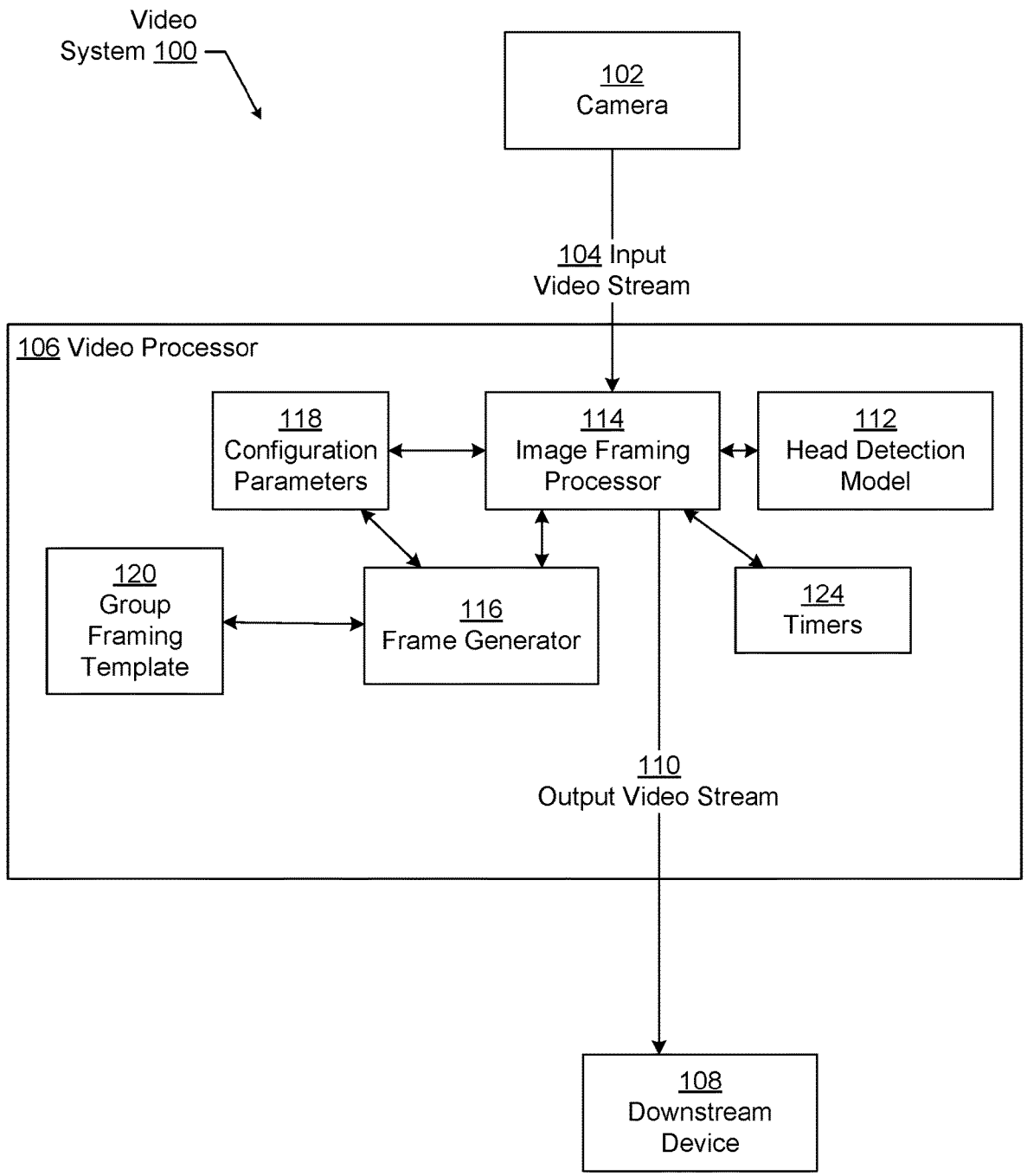
FIG. 1 shows a diagram of a system in accordance with one or more embodiments.
Figure 3:
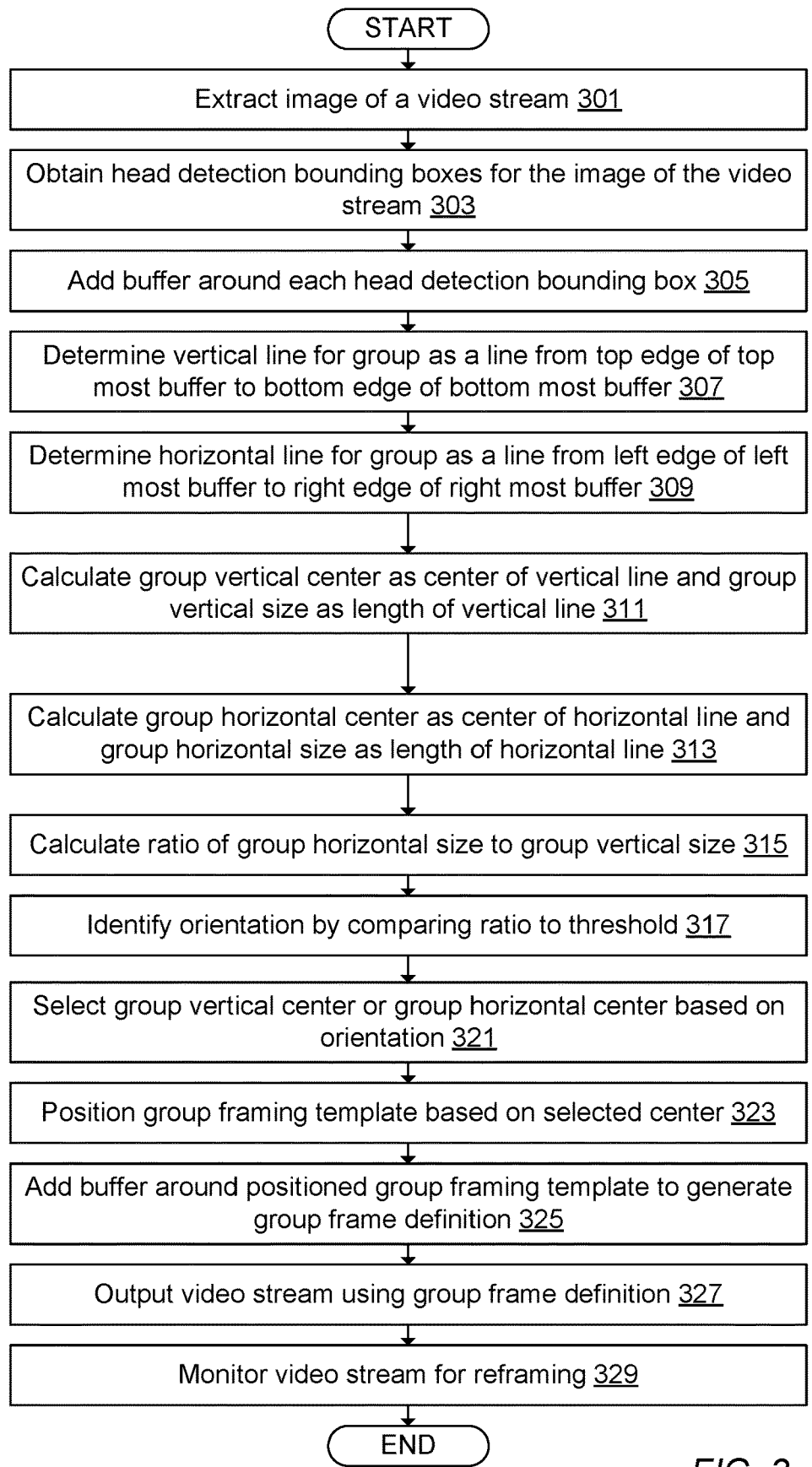
FIG. 3 shows a flowchart in accordance with one or more embodiments.

FIG. 1 is a diagram of a video system (100) in accordance with one or more embodiments. As shown in FIG. 1, the video system (100) may include a camera (102) connected to a video processor (106). The camera (102) may correspond to any type of camera that captures an input video stream (104), such as a webcam, a conference endpoint camera (e.g., as shown in FIG. 3), a standalone camera, or any other type of camera.

The camera (102) is communicatively connected to a video processor (106). The video processor (106) includes hardware or software that is configured to process the input video stream (104) and produce the output video stream (110). For example, the video processor (106) may be a computing system or an application in memory or on a non-transitory computer readable medium, such as described in FIG. 4. As another example, the video processor (106) may be a hardware processor, associated memory, and firmware integrated into the housing of the camera (102). As another example, the video processor (106) may be a conference system server or a component thereof that is an intermediary between the conference endpoints. As another example, the video processor (106) may be a video editing application. Other types of video processors may be used without departing from the scope of the disclosure.

Continuing with FIG. 1, the input video stream (104) is a video stream that is input into the video processor. The use of the term "video stream" corresponds to a standard definition used in the art. Namely, the video stream includes a sequence of images ordered in time from a continual video capture by the camera (102). If multiple cameras are present, the multiple cameras may create a single video stream that includes, for example, additional information such as depth. The video stream may include audio and other information. For nomenclature purposes, the input video stream is a sequence of input images, and the output video stream has a sequence of output images.

The output video stream (110) is a video stream that is output produced by the video processor (106). The images in the video stream include output frames. An output frame may focus the view in the camera on a single individual (i.e., head frame), group of individuals (i.e., group frame), or subgroup of individuals based on proximity (i.e., proximity frame). A group frame is a framing technique in which a single output image shows the group of the individuals in the conference room as a contiguous image. When group framing is performed, the sequence of images is each a group frame. The group frame may include all participants (i.e., group members or members of the group) as a single unbroken image regardless of proximity to each other. For other types of framing such as head and proximity framing, a single output image may include multiple frames, where each of the multiple frames is a sub-image that corresponds to a single portion of the video stream captured by the camera.

The video processor (106) may include additional components for other type of processing. For example, the additional processing may include filtering, various detection operations, and other operations. The additional processing may be performed as a preprocessing, at the same time, or in parallel with the processing described in the present application.

The video processor is communicatively interposed between the camera (102) and the downstream device (108). The downstream device (108) may be a storage device, a conference endpoint, a conferencing system server that is an intermediary between two or more conferencing endpoints, a computing system, or other device that receives the output video stream (110).

Returning to the video processor (106), the video processor (106) includes a head detection model (112), an image framing processor (114), a frame generator (116), a group framing template (120), timers (124), and configuration parameters (118). Each of these components is described below.

The head detection model (112) is a machine learning model that is trained to detect heads in an image of the input video stream (104). The head detection model (112) may be, for example, a convolutional neural network that operates on an image (e.g., an image). The head detection model (112) may use information from sub-sequence of images in the input video stream (104). The output of the head detection model (112) includes the locations of the heads of people in the image. For example, the locations may be denoted by bounding boxes around the heads of people in an image. Although a head detection model is described, a face detection model or a person detection model may be used without departing from the scope of the technology.

The image framing processor (114) is connected to the head detection model (112). The image framing processor (114) uses the location of the head detection model to determine whether an initial framing or re-framing should be performed. An initial framing may be performed based on configuration parameters (118) or the output of the head detection model. Reframing may be performed based on configuration parameters (118), the number of people detected in a room as output by the head detection model (112), movement of people (e.g., within the frames or into or out of the frames or conference room), and timers (124).

The timers (124) may be hardware or software timers that are each configured to trigger an event when a certain amount of time has elapsed. The timers (124) are frame timers specifying when to reframe. The initiation of the timers is triggered by the detection of an event by the image framing processor (114). Different timers may have corresponding different event types. A first timer may correspond to a detection of a person leaving the group frame and staying within the room. For example, the person may be detected in images of the input video stream as being outside the group frame. A second timer may correspond to a detection of a person leaving the group frame and the room. For example, the person may no longer be detected in images of the input video stream. A third timer may correspond to the detection of the members of the group frame (i.e., people shown in the group frame) being closer together. If the image framing processor (114) determines to perform reframing, the image framing processor (114) may trigger the frame generator (116). If the image framing processor (114) determines that an initial framing or reframing should not be performed, then the image framing processor (114) may use the prior output (e.g., the group frame definition) of the frame generator (116) to generate the output images in the output video stream (110).

The frame generator (116) uses, as input, an input image and locations of people specified by the head detection model (112). The frame generator (116) generates a group frame definition as output. The group frame definition defines the boundaries of each frame within the input image and zoom level for each frame. In particular, for an image, the group frame definition specifies the sub-image of the input image that forms the frame as well as the zoom level for the sub-image. Thus, the group frame definition may be a bounding box for each frame, a zoom level, and the position.

The frame generator (116) may also include a group framing template (120). A group framing template describes how a sub-image of the original image is to fit within a frame. In one or more embodiments, the group framing template defines the dimensions of the group frame and includes one or more lines for aligning the group within the frame. For example, the group framing template may specify that the size is 16:9. The group framing template may further include a vertical line for aligning the group horizontally within the frame. The group framing template may further include a horizontal line for aligning the group vertically within the frame. In one or more embodiments, the vertical line and horizontal line aligns to the group horizontal center and the group vertical center, respectively. The group horizontal center is the center of the group along the horizontal axis. The group vertical center is the center of the group along the vertical axis. The location of the vertical and horizontal line may be dependent on various factors, such as whether to include more or less lower portions of the members of the group and whether to center the group in the group frame or to have a slight skew.

Although FIG. 1 presents the image framing processor (114) and the framing generator (116) as separate components, the image framing processor (114) and frame generator (116) may be combined into a single component that operates as a single unit. Further, the group framing template (120) may be part of the frame generator (116).

Figure 2:
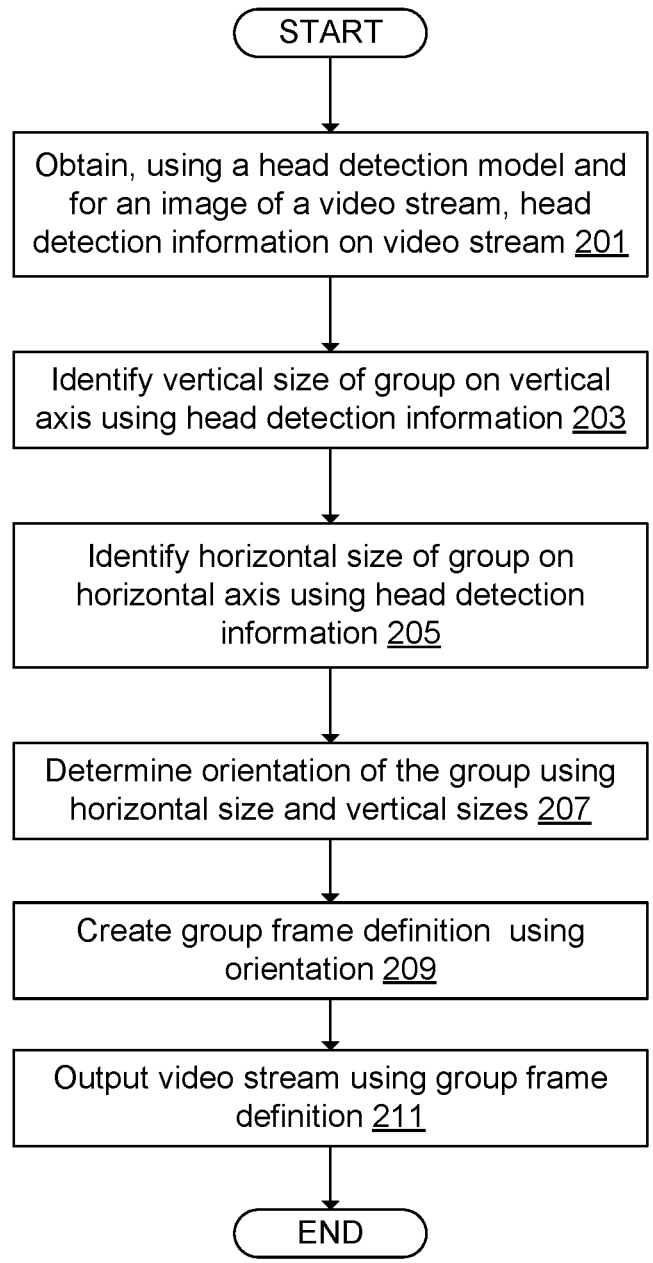
FIG. 2 shows a flowchart in accordance with one or more embodiments.

FIG. 2 is a flowchart in accordance with embodiments of the disclosure. In Block 201, using a head detection model and for an image of a video stream, head detection information is obtained. The image framing processor passes an image frame to the head detection model. The head detection model is a convolutional neural network that processes the image features of the image to detect the locations of the heads in the image. The output of the head detection model is passed to the frame generator.

In Block 203, the vertical size of the group is identified on the vertical axis using the head detection information. The vertical size is the distance of the topmost person in the image to the bottom most person in the image. Calculating the vertical size includes extracting the vertical coordinates in the head detection information of the topmost person and the vertical coordinates in the head detection information of the bottom most person. The distance between the two sets of vertical coordinates is the vertical size.

In Block 205, the horizontal size of the group is identified on the horizontal axis using the head detection information. The horizontal size is the distance of the left most person in the image to the right most person in the image. Calculating the horizontal size includes extracting the horizontal coordinates in the head detection information of the left most person and the horizontal coordinates in the head detection information of the right most person. The distance between the two sets of horizontal coordinates is the horizontal size.

In Block 207, the orientation of the group is determined using the horizontal size and the vertical size. The group is vertically aligned if the horizontal size is substantially smaller than the vertical size, otherwise the group may be determined horizontally aligned. A vertically aligned group is deemed vertically oriented, and a horizontally aligned group is deemed horizontally oriented.

In Block 209, a group frame definition is created based on the orientation. If the group is horizontally oriented, then the horizontal line of the template is used to position the template on the image of the group. If the group is vertically oriented, then the vertical line of the template is used to position the template on the image of the group. The zoom level is set to include the coordinates of each of the members of the group. Adjustments may be performed based on the location of the group. The group frame definition is the zoom level and the position of the template.

In Block 211, the video stream is output using the group frame definition. Each image of the video stream is adjusted as defined by the group frame definition to zoom in according to the zoom level and to crop out the region not in the group frame as specified by the group frame definition. During video conferencing (e.g., an active conference call between endpoints), the video stream for the participants in the conference room is adjusted in real time to create an output stream having group frames. The video processor monitors the group frames to determine whether reframing should be performed as described above. Thus, the group is reframed as people move in the room or people enter or leave the room.

FIG. 3 shows a method of performing group framing that is more detailed than FIG. 2. Other techniques besides those describe in FIG. 3 may be used without departing from the scope of the technology. Further, in some implementations, some of the operations of FIG. 3 may be omitted or modified. In Block 301, an image of a video stream is extracted. The camera captures the video stream in real time and passes the video stream to the video processor. The video processor processes the video stream before sending the video stream to the downstream device. In the video processor, the image frame processor extracts an image from the video stream for processing. In some embodiments, the extracting of the image is a sampling of the video stream performed at a predefined interval, such as at a defined number of microseconds. Thus, at each elapse of the predefined interval, the image frame processor extracts an image for separate processing and continues to perform framing of the video stream according to the current configuration. The framing is performed by the image frame processor cropping and zooming into each image of the video stream according to the current configuration. Initially, the cropping and zooming is a default configuration. However, when a frame definition (e.g., group frame definition) is generated from the frame generator, the frame definition is applied by the image framing processor to the stream. Because a live conference call is occurring, the processing is performed quickly so as to be applicable to the current configuration of the group being displayed. Thus, the processing described in FIG. 3 is performed in real-time to create a new group frame definition.

In FIG. 3, the image that is extracted shows a group of members of the conference (i.e., participants or people in the conference). However, the video processor has not yet detected that the image shows the group or the configuration of the group.

In Block 303, head detection bounding boxes are obtained for the image of the video stream. The image frame processor transmits the image to the head detection model that is a convolutional neural network. The convolutional neural network processes the pixel values of the image through several layers to classify different parts of the image as corresponding to heads. The head detection model then outputs bounding boxes around the heads of the image. For example, the bounding boxes may be a starting coordinate, a length and a width or opposite corners of each bounding box.

The head detection bounding boxes are passed to the frame generator. In Block 305, the frame generator adds a buffer around each of the head detection bounding boxes. The buffer accommodates that the head detection bounding box may be too close to the head and miss ears, chins, and other close extremities of the head. Thus, the buffer may increase the height and width evenly by fifty percent. In other words, the result is a box that is twice the height and width of the bounding box.

In Block 307, the frame generator determines a vertical line for the group as a line from a top edge of a topmost buffer to a bottom edge of a bottom most buffer. The frame generator identifies the topmost coordinate of all of the buffers along the vertical axis of the image and the bottom most coordinate of all of the buffers along the vertical axis.

Similarly, in Block 309, the frame generator determines a horizontal line for group as a line from left edge of left most buffer to a right edge of a right most buffer. The frame generator identifies the right most coordinate of the buffers along the horizontal axis of the image and the left most coordinate of a buffer along the horizontal axis.

For the vertical axis, the group frame generator calculates the group vertical center is calculated as center of vertical line and a group vertical size as a length of the vertical line in Block 311. The midway point on the vertical line is the group vertical center. The group vertical size is calculated as the absolute value of the difference between the topmost coordinate of all of the buffers to the bottom most coordinate of all of the buffers (e.g., the distance between the two coordinates).

For the horizontal axis, the group frame generator calculates a group horizontal center as a center of the horizontal line and a group horizontal size as a length of the horizontal line in Block 313. The midway point on the horizontal line is the group horizontal center. The group horizontal size is calculated as the absolute value of the difference between the right most coordinate of all of the buffers to the left most coordinate of all of the buffers (e.g., the distance between the two coordinates).

In Block 315, the group frame generator calculates a ratio of group horizontal size to group vertical size. For example, the group frame generator divides the horizontal size by the vertical size. In Block 317, the group frame generator identifies the group orientation by comparing the ratio to a threshold. The threshold is based on the size of the output image. For example, if the size of the output image is 16:9, then the threshold may be set to 1.77, which is 16 divided by 9. Other thresholds may be used. If the ratio is greater than the threshold, then the group is a horizontal group. If the ratio is less than the threshold, then the group is a vertical group. The group may be deemed either or both a vertical and horizontal group when the ratio equals the threshold.

The group frame generator selects either the group vertical center or the group horizontal center based on group orientation in Block 321. If the group is a horizontal group, then the group horizontal center is selected. If the group is a vertical group, then the group vertical center is selected.

The group framing template is positioned using the group horizontal center or the group vertical center based on the orientation to obtain a positioned group framing template in Block 323. If the group orientation is horizontal, then the group horizontal center is aligned with the vertical line of the template. If the group is a vertical group, the group vertical center is aligned with the horizontal line. The zoom amount is adjusted such that the ends of the vertical line determined in Block 307 aligns with the top and bottom edges of the template in the case of a vertically oriented group. In the case of the horizontally oriented group, the zoom amount is adjusted such that the ends of the horizontal line determined in Block 313 aligns with the right and left edges of the template. In some cases, when the group is at the edges of the image, once the template is positioned as described above, the template is determined to include a portion not covered by the image. In such a scenario, the template is moved right, left, top, or bottom, so that the edge of the template is the edge of the image.

In Block 325, once positioned a buffer is added around the positioned group framing template to generate a group frame definition. The group frame definition then specifies the location within the image of the positioned template and the zoom level to generate the group frame.

In Block 327, the video stream is outputted using group frame definition. The group frame definition is passed to the image framing processor that adjusts the images according to the group frame definition and sends the images to the downstream device.

In Block 329, the image framing processor monitors the video stream for refreshing. Specifically, the image framing processor continues to extract images from the video stream to detect events in the video stream. For example, if the event is that a member of the group moved outside of the group frame definition, then a corresponding timer for the movement of the member is initiated responsive to the detection. The amount of the corresponding timer is set such to account for the fact that the member may immediately return and to avoid flickering of the image. If the member does not return within the elapse of the time, a reframing of the group frame definition is triggered responsive to not detecting the member in the group frame at an elapse of a threshold amount of time according to the timer.

As another example, the event may be that a group size decreases, such as the horizontal or vertical size of the group. Namely, the members of the group may get closer to each other. A corresponding timer is then triggered. If the group size does not increase, then a reframing is triggered responsive to the group size remaining decreased at an elapse of a threshold amount of time according to the timer.

As another example, the detection may be that a member of the group leaves the room. Namely, the member may be out of the area captured by the image. A corresponding timer is initiated. If the member does not return, then a reframing is triggered responsive to not detecting the member in the room at an elapse of a threshold amount of time according to the timer.

FIGS. 4-11 show an example in accordance with one or more embodiments. FIGS. 4-11 show examples of group framing of a horizontal oriented group and a vertical oriented group. Group framing is the framing in a conference room. The goal is to obtain meeting equity in a hybrid meeting. The meeting equity is for the people attending in the room by expanding the group and focusing on the group. Thus, people attending in the room are increased in size after group framing as compared to prior to group framing, such that the people attending in the room are closer to the size of the meeting participants outside of the room.

Turning to FIG. 4, in a conference room, people may be located in any location of the conference room including standing, sitting or in another position. Further, the faces of people may be directed at the camera, away from the camera, or any angle between facing the camera and away from the camera. In the example, the input images (402, 404) are different images extracted from different video streams. Both of the examples correspond to live conference calls in which people in the conference room are interacting with people outside of the conference room through conferencing devices. A camera captures the input stream of the conference room. The housing of the camera includes the video processor that both processes the video stream and performs the group framing on the video stream. Input image (402) shows people on either side of the conference room spread out horizontally while input image (404) shows people in the conference room near each other, but vertically spaced. The subsequent figures describe the analysis of the images of FIG. 4 to perform the group framing.

Figure 5:
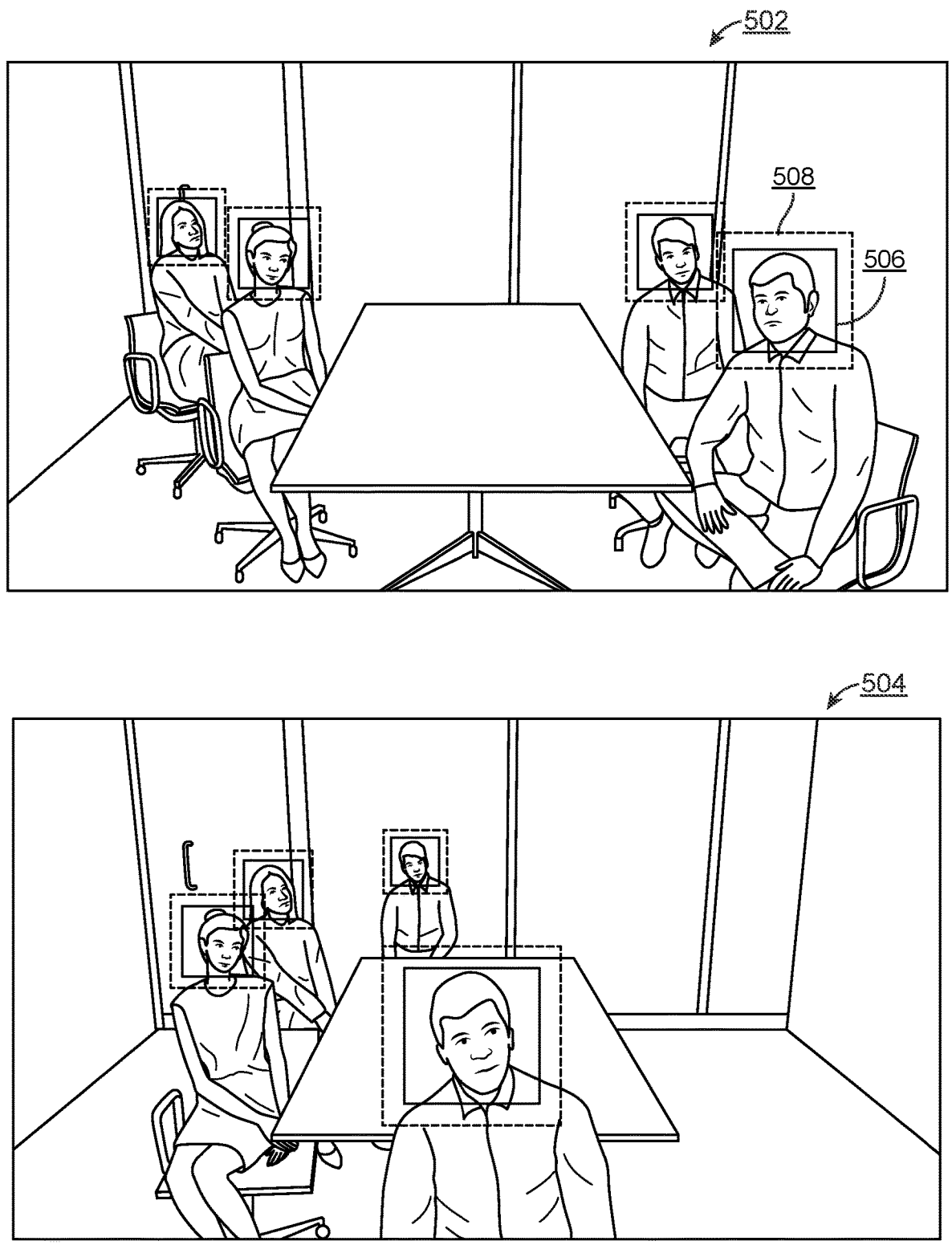

Turning to FIG. 5, the head detection model identifies the heads of individual people in the conference room as shown in images (502, 504). The head detection model outputs a head bounding box as shown by the solid line squares (e.g., bounding box (506)). A head buffer around the head bounding box is added as shown by dashed line boxes (e.g., buffer (508)). The head buffer is defined so as to include a person's full head. In the example, the head buffer increases the head bounding box by 50%. The increased region that includes the head bounding box with the head buffer is referred to as head buffer bounding box and is the region of the dashed line box (e.g., buffer (508)).

Figure 6:
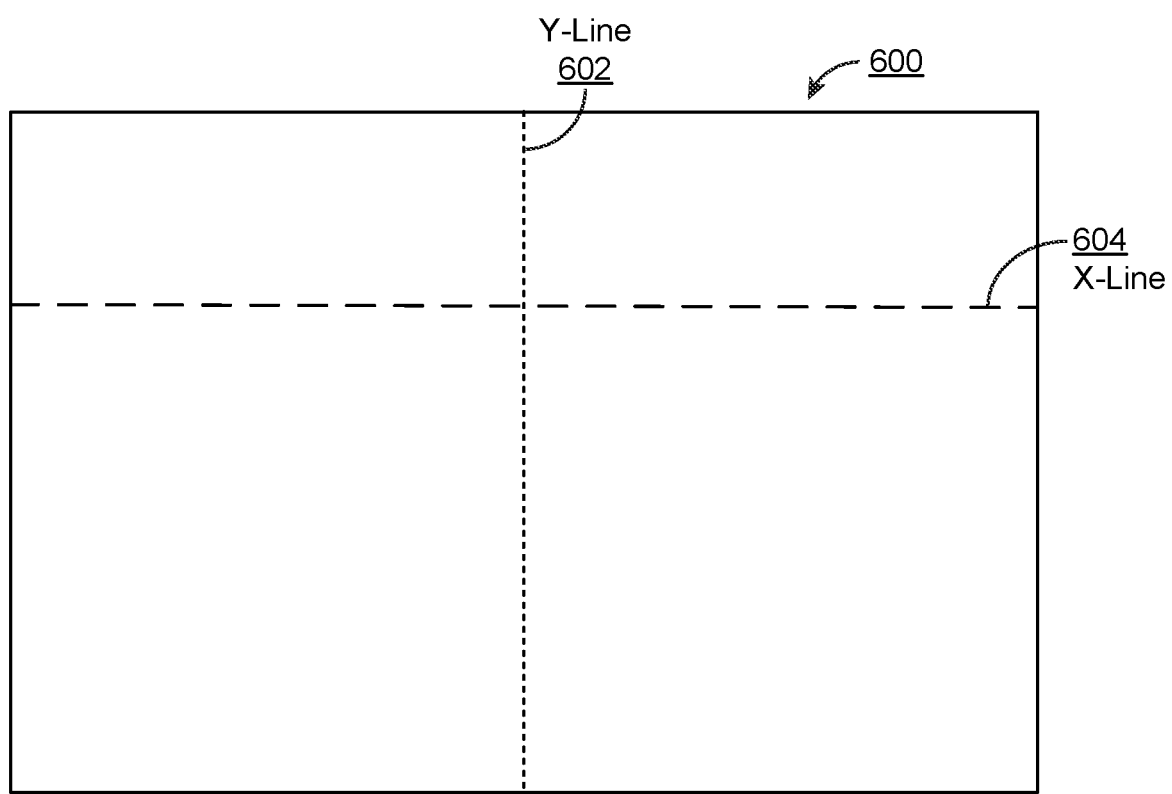

FIG. 6 shows a group frame template (600). The group frame template (600) includes a vertical line (i.e., Y-Line (602)) and a horizontal line (i.e., X-Line (604)), which are defined at particular positions in the template and are orthogonal to the edges of the template that the lines intersect. The size of the group frame template is based on the size of the output image. In the example, the group frame template has a 16:9 ratio of the horizontal size to the vertical size. The ratio may be based on the expected ratio for the output image. The 16:9 is only an example and other sizes may be used without departing from the scope of the technology.

The vertical line (612) and the horizontal line (614) are defined based on which portions to add to the group frame. In the example, the vertical line is down the center of the rectangle to focus the output image on the horizontal center of the group. The horizontal line is located ⅓ of the vertical length of the template from the top of the template (600). The purpose of the ⅓ rather than center is to show more of the people (e.g., torso/legs) than to show unused areas. Specifically, because the matching to the template uses the head bounding boxes which is at the top of a persons' body, if the horizontal line (604), were at the center, then more ceiling and area above participants' heads would be shown. The centering of the vertical line and the positioning of the horizontal line in the template of FIG. 6 is only an example. Other positions may be used. For example, the horizontal line may be at any position above the center.

Figure 7:
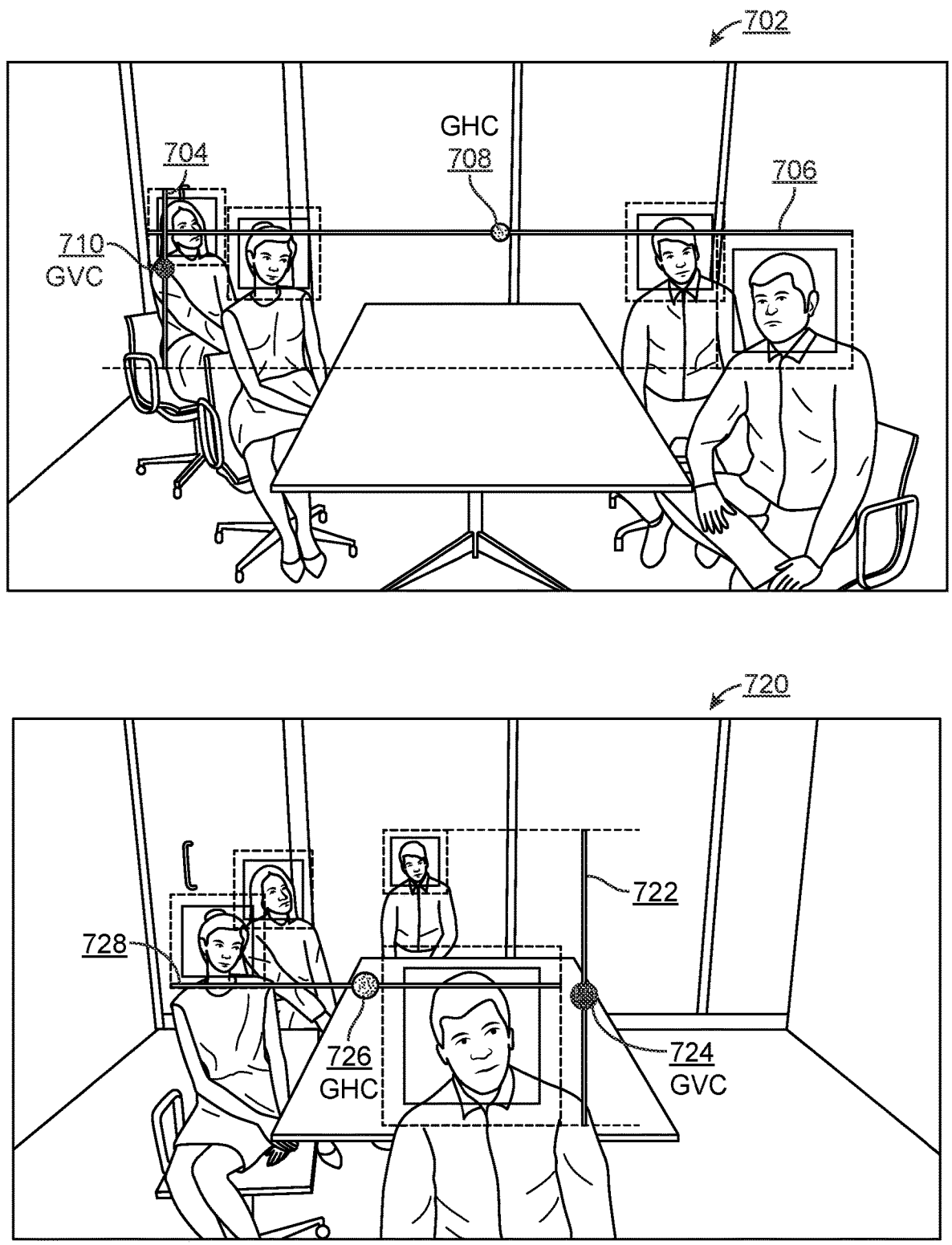

Turning to FIG. 7, FIG. 7 shows the example of the groups of FIG. 4 with the bounding boxes and determining whether the groups are wide or narrow. As shown in FIG. 7, for both images (702, 720), a horizontal line (706, 728) is defined from the left edge of the left most buffer to the right edge of the right most buffer. Halfway along the horizontal line (706, 728) is the group horizontal center (708, 726). Similarly, a vertical line (704, 722) is defined from the top edge of the topmost buffer to the bottom edge of the bottom most buffer. Halfway along the vertical line (704, 722) is the group vertical center (710, 724).

Using the vertical and horizontal lines, a determination is made whether the group layout is wide, or the group layout is narrow. Generally, the determination as to whether the group is wide or narrow is a determination of the distribution of people in the room.

The vertical distance between the top edge of the top-most head buffer bounding box and the bottom edge of the bottom-most head buffer bounding box (e.g., length of vertical line (704, 722)) is calculated. The horizontal distance between the left edge of the left-most head buffer bounding box and the right edge of the right-most head buffer bounding box (e.g., length of horizontal line (706, 728)) is calculated. The horizontal distance is divided by the vertical distance to obtain a value. If the value is greater than a threshold, then the group layout is wide. If the value is less than a threshold, then the group layout is narrow. In FIG. 7, because the template is size 16:9, the threshold is 16/9 or around 1.77. Other thresholds may be used.

Although the edges of the head buffer bounding boxes are used, other locations may be used. For example, the edges of the head bounding boxes may be used. In another scenario, if face detection or body detection is performed, then the face bounding boxes/body bounding boxes may be used.

In image (702), the length of the horizontal line (706) is 2.7 and the length of the vertical line (704) is 0.69. 2.7 divided by 0.69 is 3.9. Because 3.9 is greater than 1.77, the group orientation is wide or horizontally oriented. In contrast, in image (720), the length of the horizontal line (728) is 1.53 and the length of the vertical line (722) is 1.16. 1.53 divided by 1.16 is 1.31. Because 1.31 is less than 1.77, the group orientation is narrow or vertically oriented.

Figure 8:
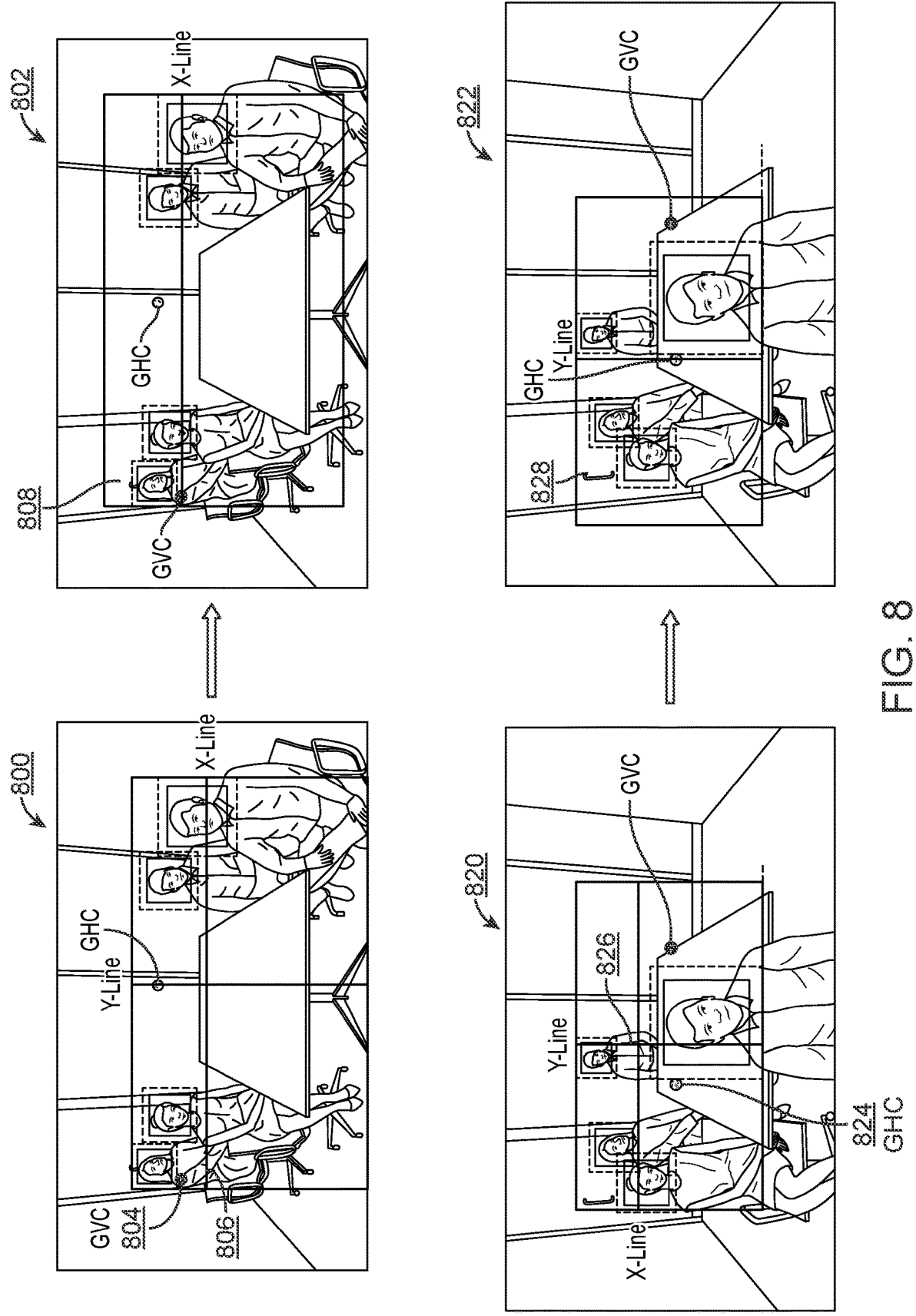

FIG. 8 shows the example of positioning the group framing template, the group framing template is placed as shown in the two images (800, 820) to touch the outer edges of the outer most head buffer bounding boxes. As shown, the template is placed so that the opposite edges of at least two sides of the template touches the outermost edges of at least two of the head buffer bounding boxes. Thus, all of the head buffer bounding boxes are within the template. Zooming in of the input image or resizing the template proportionally may be performed.

Next, further positioning of the group framing template (808, 828) is performed as shown in images (802, 822) based on whether the group layout is wide or narrow. If the group layout is wide as shown in image (802), the horizontal line is placed as close as possible to the group vertical center (GVC). The result is the positioning (808) of the template.

If the group layout is narrow, the vertical line is placed as close as possible to the group horizontal center (GHC). The result is the positioning (828) of the template.

If the group is neither wide nor narrow, then the center may be performed as if the group were either wide or narrow. As another example, both operations may be performed. As another example, the template may be applied and the zooming may be performed.

Figure 9:
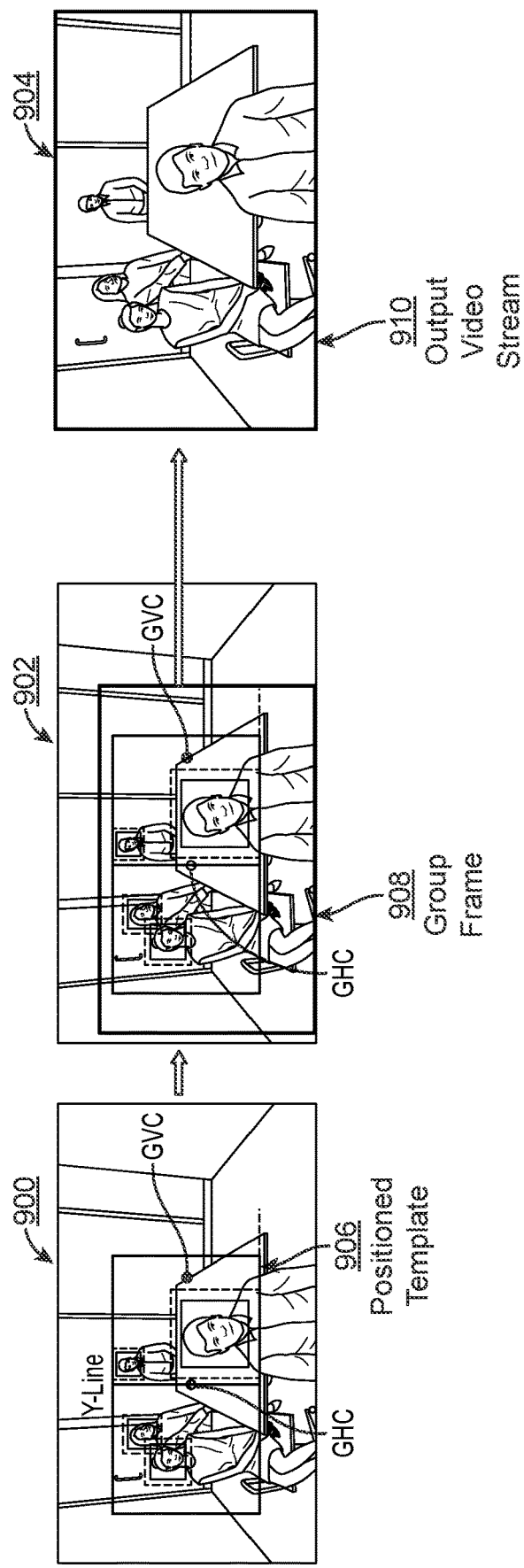

FIG. 9 shows adding a buffer to the positioned template (906) of image (900). As shown in image (902) of FIG. 9, a buffer is added to create a group frame (908). The buffer may be equal on each side or different on each side as shown in FIG. 9. In the example, 10% of the vertical distance added as a top buffer while 30% of the vertical distance is added as a bottom buffer. 20% of the horizontal distance is added as a buffer on the left and right side. The result as shown in image (904) is the group frame in the output video stream (910).

Figure 10:
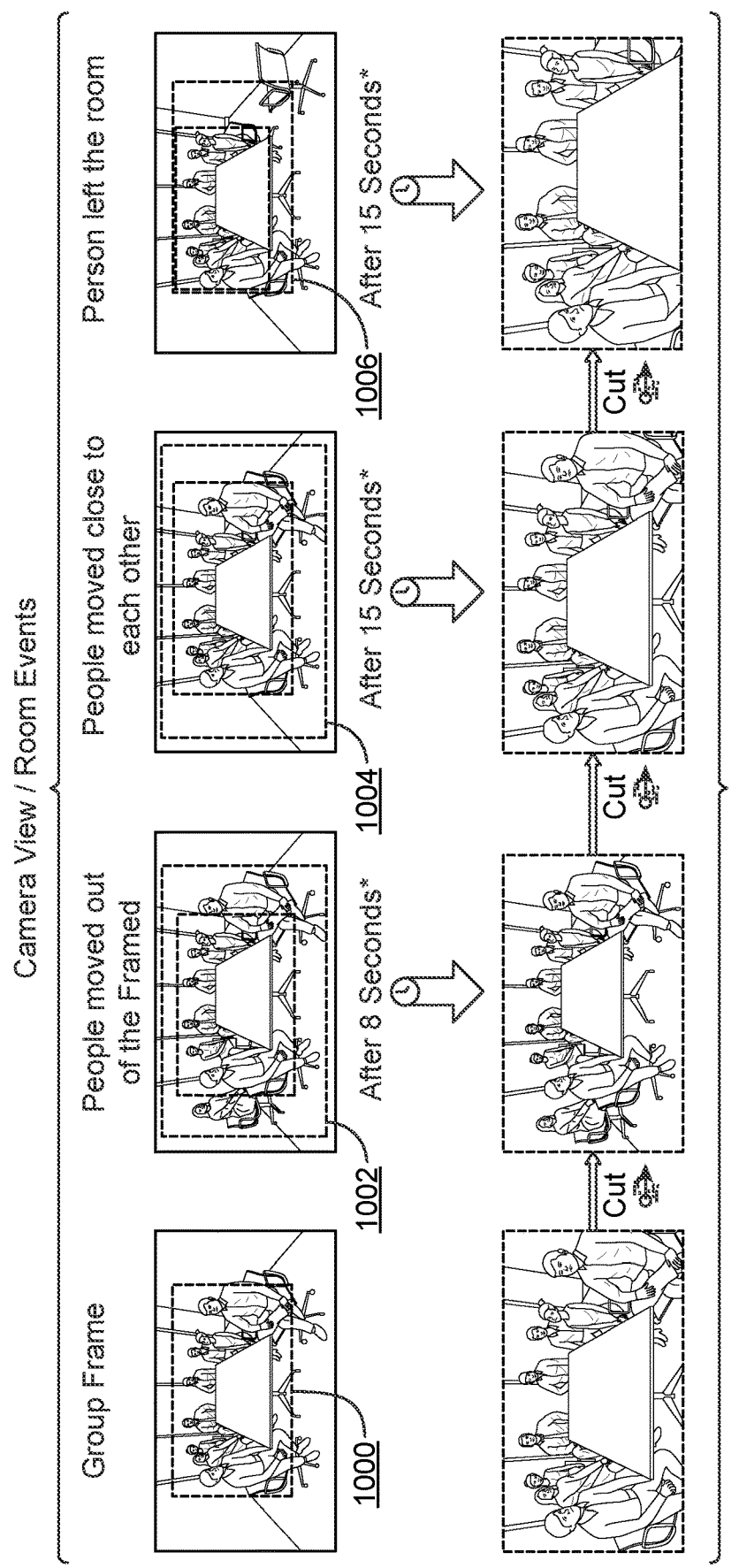

FIG. 10 shown examples of when to reframe based on a person's movement in the video stream. The top row is the original image. The bottom row is the resulting group frame. The participants move in the conference room from left to right.

Time (1000) shows the initial image with the initial framing Δt time (1002), the participants move out of the group frame and remain in the image region captured by the camera. The reframing timer starts and after a first threshold amount of time (e.g., 8 seconds), reframing is performed as shown in the bottom row.

At time (1004), the participants move closer together. The reframing timer starts and after a second threshold amount of time (e.g., 15 seconds), reframing is performed as shown in the bottom row.

At time (1006), a participant leaves the room. The reframing timer starts and after a third threshold amount of time (e.g., 15 seconds), reframing is performed as shown in the bottom row.

In the transitions, the purpose of the reframing is to refocus the frames on the group without causing a flickering. Namely, by waiting a period, the endpoints does not see unnecessary changes in the frames despite movement of people in the room.

Figure 11:
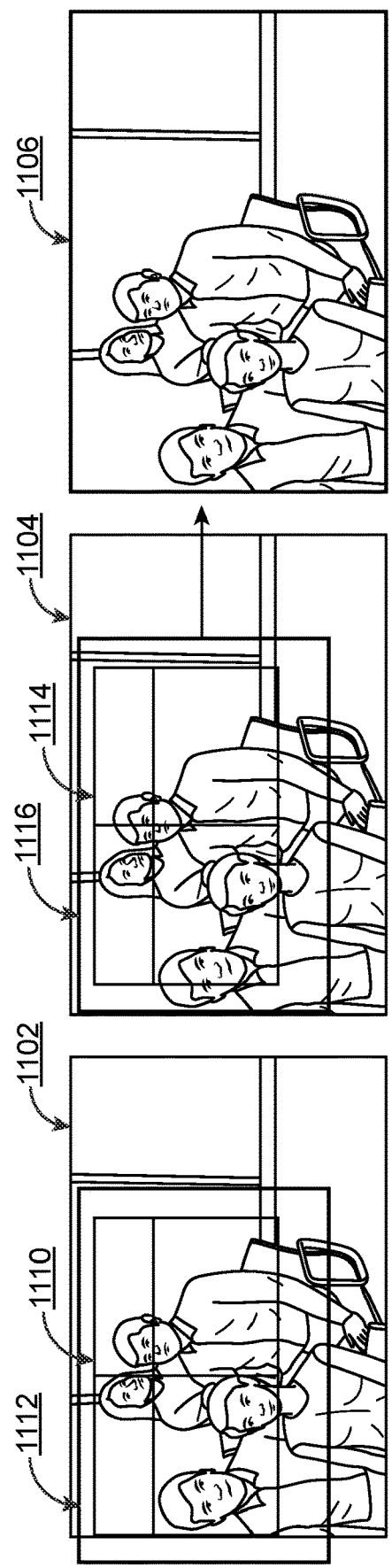

FIG. 11 show an example in which the people are at an edge of a camera view. The image (1102) includes the people at the edge. Thus, when the template (1110) is placed, insufficient room exists to add buffer (1112) at the left side. As shown in FIG. 11, if not enough camera view exists, then the buffer (1116) and template (1114) may be shifted as shown in image (1104) to show more of the unused area of the room. The result is group frame (1106).

The framing described herein may include the following features. The group framing template is specified at a 16:9 aspect ratio for stream output. The template includes two alignment lines for vertical and horizontal adjustments. Using head detection artificial intelligence, a group is identified as a wide group or a narrow group by dividing the widest distance of heads to the longest distance of heads. This numeric value is compared against the 16:9 aspect ratio and provides guidance on group frame adjustments. Further, vertical and horizontal adjustments are made based on the alignment lines in the group framing template and a specified buffer is added to template to give the final composition. Further, one or more embodiments have various events and consequent timings and behaviors to respond to people's movements and keep people's head in the group frame with minimal distraction.

The framing may be used in a case of a hybrid mode of a conference meeting. In a hybrid mode, some people of the conference have their own conference endpoints while other people of the conference are in a conference room in which the conference endpoint is shared across the conference room. For example, when people join in conference meeting from home, they get a dedicated camera showing a single video of them. In contrast, when people gather in a conference room in office for meetings, there will be a single video that shows the entire in-room with multiple participants. This leads to meeting inequality in hybrid meetings. The meeting inequity is that the people at home are allocated a larger percentage space in a conference user interface than the people in the conference room. Further, the conference room may further have larger areas than the person at home in which no person is located. Namely, the camera in the conference room may capture a larger amount of unused space than the dedicated camera. The framing described herein may reduce or eliminate the meeting inequity by reducing the unused space and focusing the video stream on the participants. Thus, the framing may be used in a case of real-time, live meeting between participants.

Figure 12:
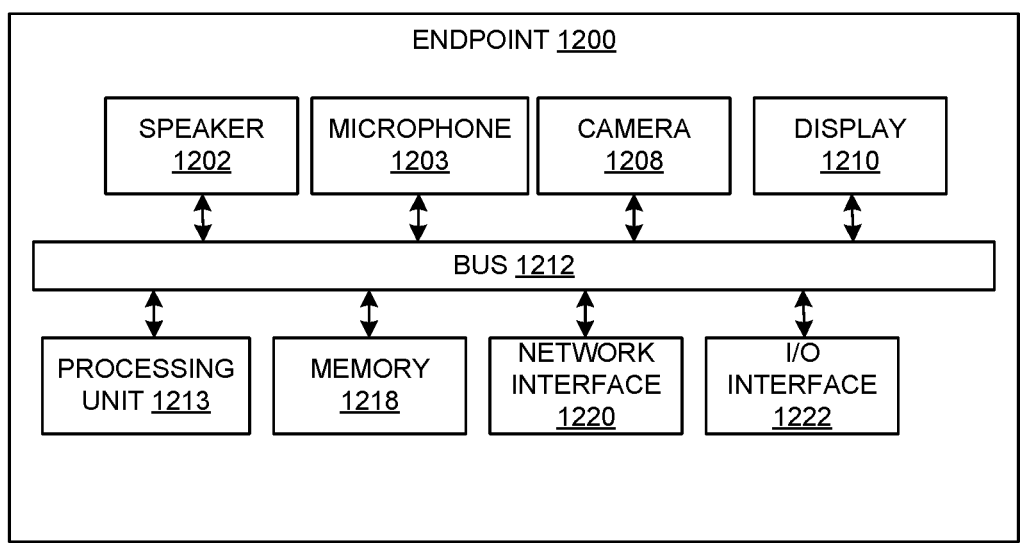
FIG. 12 shows an endpoint in accordance with one or more embodiments.

FIG. 12 shows an example of an endpoint (1200). The endpoint (1200) is used to participate in video conferences. Embodiments of the endpoint (1200) include video conferencing apparatuses, which may include mobile phones, laptop computers, desktop computers, tablet computers, video bars, etc. The endpoint (1200) of FIG. 12 communicates with one or more remote endpoints over a network using the network interface (1220). The endpoint (1200) includes multiple hardware and software components.

The speaker (1202) converts electrical audio signals into corresponding sound that may be heard by the users of the endpoint (1200). The speaker (1202) may be one of multiple speakers that are part of the endpoint (1200).

The microphone (1203) converts sound to corresponding electrical audio signals. The sound includes the speech of the users of the endpoint (1200). The microphone (1203) may be one of multiple microphones that are part of the endpoint (1200).

The camera (1208) converts light to corresponding electrical images and video. In one embodiment, the camera includes joints and motors to control the direction the camera is pointing and the amount of zoom of the camera. The camera (1208) may be one of multiple cameras that are part of the endpoint (1200).

The display (1210) converts electrical signal to corresponding images that may be viewed by users of the endpoint (1200). In one embodiment, the display (1210) may be a touch sensitive display that converts touch inputs from a user to electrical signals. The display (1210) may be one of multiple displays that are part of the endpoint (1200).

The bus (1212) is a communication system that transfers data between the components inside the endpoint (1200). The bus (1212) may use electrical or optical signals to transfer data between the components.

The processing unit (1213) is a collection of digital circuits that process the data and information captured and used by the endpoint (1200). The processing unit (1213) may include one or multiple processors. The processing unit (1213) executes the programs stored in the memory (1218). The programs include software instructions in the form of computer readable program code that, when executed, cause the endpoint (1200) to perform the operations of the embodiments of the disclosure.

The memory (1218) is a collection of circuits that are used to store information used by endpoint (1200). The memory (1218) stores programs and data that are executed and used by the processing unit (1213). The memory (1218) may include volatile memory and nonvolatile memory.

The network interface (1220) is the point of connection between the endpoint (1200) and other networks and endpoints. The network interface (1220) may include interfaces for wired networks (e.g., ethernet) and wireless networks (e.g., wireless local area network (WLAN), mobile phone networks, etc.).

The input/output (I/O) interface (1222) is the point of connection between the endpoint (1200) and I/O devices. The input/output (I/O) interface (1222) may include physically connected interfaces (e.g., universal serial bus (USB)) and wireless interfaces (e.g., personal area networks (PAN)). The input/output (I/O) interface (1222) may connect the endpoint to keyboards and mice, as well as to additional speakers, microphones, cameras, displays, etc.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   obtaining, by applying a head detection model to an image in an incoming video stream, a plurality of bounding boxes from the image;
   identifying, using a left edge of a buffer around a leftmost one of the bounding boxes and a right edge of a buffer around a rightmost one of the bounding boxes, a group horizontal size that extends along a horizontal axis from the left edge to the right edge;
   identifying, using a top edge of a buffer around a topmost one of the bounding boxes and a bottom edge of a buffer around a bottommost one of the bounding boxes, a group vertical size that extends along a vertical axis from the top edge to the bottom edge;
   dividing, to calculate a ratio of a group size in the image, a length of the group horizontal size by a length of the group vertical size; and
   identifying, by comparing the ratio of the group size in the image to an aspect ratio of an outgoing video stream, an orientation of a group in the image.

2. The method of claim 1, wherein obtaining head detection information comprises:
   extracting the image from the incoming video stream;
   processing the image to obtain a plurality of head detection bounding boxes for the image of the incoming video stream; and
   adding a buffer around each head detection bounding box of the plurality of head detection bounding boxes to obtain the head detection information.

3. The method of claim 2, wherein the plurality of head detection bounding boxes are around a plurality of members of the group.

4. The method of claim 1, wherein identifying the group vertical size comprises:
   calculating the group vertical size as a distance from the top edge to the bottom edge, wherein determining the orientation of the group is based on the group vertical size.

5. The method of claim 4, wherein identifying the group horizontal size comprises:
   calculating the group horizontal size as a distance from the left edge to the right edge,
   wherein determining the orientation of the group is performed based on a comparison of the group vertical size to the group horizontal size.

6. The method of claim 1, further comprising:
   creating a group frame definition by calculating a group vertical center as a center of a vertical line from the top edge to the bottom edge,
   wherein the group vertical center is used to create the group frame definition.

7. The method of claim 6, wherein creating the group frame definition comprises:
   positioning a group framing template to align with the group vertical center based on the orientation indicating that the group is vertical.

8. The method of claim 1, further comprising:
   creating a group frame definition by calculating a group horizontal center as a center of a horizontal line from the left edge to the right edge,
   wherein the group horizontal center is used to create the group frame definition.

9. The method of claim 8, further comprising:
   positioning a group framing template to align with the group horizontal center based on the orientation indicating that the group is horizontal.

10. The method of claim 9, further comprising:
    adding a buffer around the group framing template on the positioned group framing template to generate the group frame definition.

11. The method of claim 1, further comprising:
    making a detection of a member of the group moving outside of a first group frame defined by a group frame definition;
    initiating a timer responsive to the detection; and
    triggering a reframing responsive to not detecting the member in a second group frame defined by the group frame definition at an elapse of a threshold amount of time according to the timer.

12. A method comprising:
obtaining, using a head detection model and for an image in a video stream, head detection information on the video stream;
identifying a group vertical size of a group on a vertical axis using the head detection information;
identifying a group horizontal size of the group on a horizontal axis using the head detection information;
determining an orientation of the group using the group horizontal size and group vertical size;
creating a group frame definition using the orientation;
outputting the video stream using the group frame definition;
making a detection of a group size decreasing, wherein the group size is at least one of the group vertical size and the group horizontal size;
initiating a timer responsive to the detection; and
triggering a reframing responsive to the group size remaining decreased at an elapse of a threshold amount of time according to the timer.

13. The method of claim 1, further comprising:
making a detection of a member of the group leaving a room;
initiating a timer responsive to the detection; and
triggering a reframing responsive to not detecting the member in the room at an elapse of a threshold amount of time according to the timer.

14. A system comprising:
a video processor to:
obtain, by applying a head detection model to an image in an incoming video stream, a plurality of bounding boxes from the image;
identify, using a left edge of a buffer around a leftmost one of the bounding boxes and a right edge of a buffer around a rightmost one of the bounding boxes, a group horizontal size that extends along a horizontal axis from the left edge to the right edge;
identify, using a top edge of a buffer around a topmost one of the bounding boxes and a bottom edge of a buffer around a bottommost one of the bounding boxes, a group vertical size that extends along a vertical axis from the top edge to the bottom edge;
divide, to calculate a ratio of a group size in the image, a length of the group horizontal size by a length of the group vertical size; and
identify, by comparing the ratio of the group size in the image to an aspect ratio of an outgoing video stream, an orientation of a group in the image.

15. The system of claim 14, further comprising:
an image framing processor to output the outgoing video stream.

16. The system of claim 15, wherein the outgoing video stream comprises the group in the image.

17. The system of claim 14, wherein the video processor comprises:
a group framing template to position the incoming video stream.

18. The system of claim 14, wherein the group in the image is a group of people.

19. The system of claim 14, further comprising:
a camera to capture the incoming video stream.

20. The system of claim 19, wherein the video processor is within a housing of the camera.

* * * * *